Figure 1:
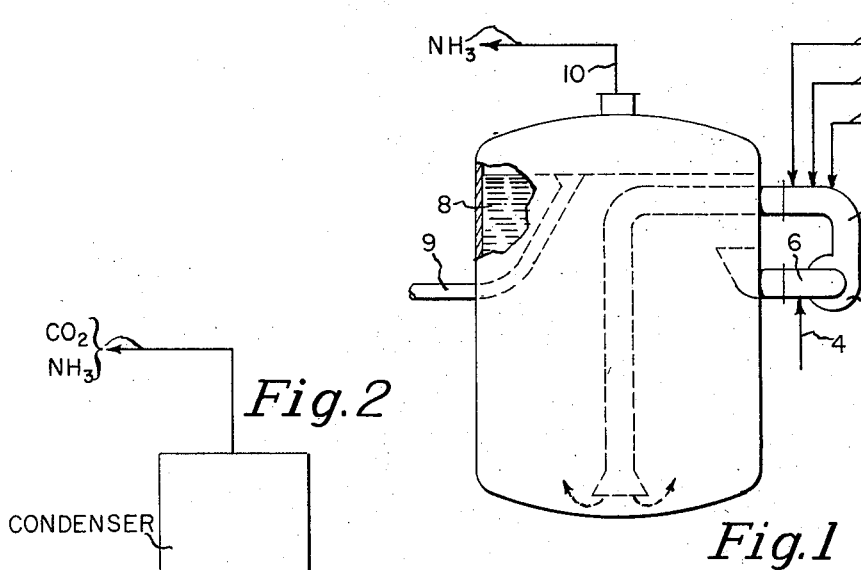
Figure 2:
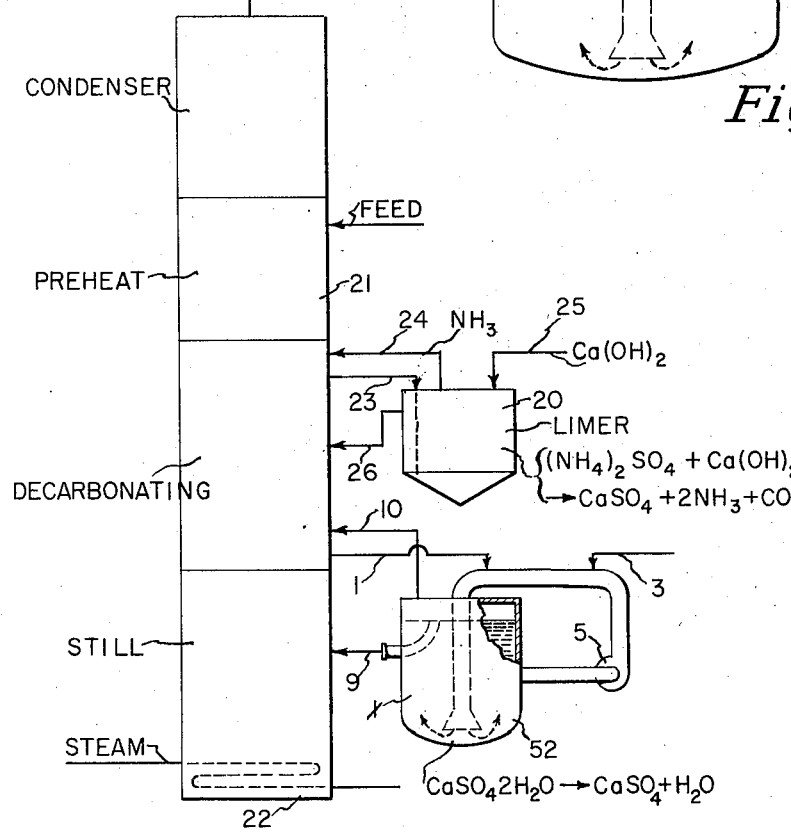

INVENTOR
HANS SVANOE
BY
ATTORNEY

United States Patent Office 2,892,682
Patented June 30, 1959

2,892,682
INHIBITION OF SCALE FORMATION IN THE RECOVERY OF AMMONIA IN THE AMMONIA-SODA PROCESS

Hans Svanoe, Warren, Pa., assignor to Struthers Wells Corp., Warren, Pa., a corporation of Maryland Application August 10, 1955, Serial No. 527,520

5 Claims. (Cl. 23—193)

This invention relates to processes in which ammonia is recovered from its chloride or sulfate by treatment with lime and is more particularly related to the reduction of scale formation during the distillation and auxiliary operations that are conducted in the so-called ammonia-soda process, also known as the Solvay process.

In the manufacture of soda-ash by the Solvay process, the recovery of ammonia usually takes place in a continuously operated distillation tower. The tower is ordinarily divided into four sections, an upper condenser section under which is a preheater section into which a "filter liquor" is fed. Below the preheater section is a decarbonator in which carbon dioxide is driven from the carbonates of the feed and in which lime is introduced, usually from a prelimer. In the base of the tower there is a still section with means for providing heat for the metathetical and decomposing reactions of the tower. Apparatus for use in the process will be more specifically described hereinafter.

Hard scale forms in the operation of the equipment, especially in the limer, the still sections and in the distillation heater surfaces. This scale formation requires the distiller to shut down for a scale removal operation frequently in normal operation of such processes. Moreover, so interrupting the distillation operation causes solids to settle in the lime stills, necessitating additional cleaning. The magnitude of this problem can be appreciated by recognizing the extent and size of the scale usually allowed to form before removal. Thicknesses of this scale, which is very hard, are permitted to grow to 1 to 2 inches.

Scale removal by the methods used prior to the instant invention involved chiselling by hand or by pneumatic scaling hammers. Moreover, before descaling the equipment the scale should be cooked for several hours with steam to drive off ammonia. Only then is the still and other equipment ready for the tedious and costly job of mechanical scale removal. The invention is directed to a process of conducting the ammonia-soda process and related processes in which scale formation is reduced and substantially eliminated.

An object of the present invention is to provide an ammonia-soda process in which scale formation during ammonia recovery is inhibited. Another object is to provide means whereby the crystal habit of scale forming salts present in an ammonia-soda distiller is altered to prevent scale formation. A further object is to provide auxiliary equipment wherein the salts responsible for scale formation are in a stable form. Other objects and advantages of the invention will hereinafter appear.

Practically all brines used as raw materials for soda ash production contain $Na_2SO_4$, the substantial part of the $SO_4$ ion of which appears later in the process as $CaSO_4$. This is formed during the course of the following reaction that occurs in the ammonia still: (Due to the fixed ammonium present, the $SO_4$ ion can be considered at present as $(NH_4)_2SO_4$ as well; insofar as calcium sulfate is concerned, the result will be the same.)

(A) $(NH_4)_2SO_4 + Ca(OH)_2 \rightarrow CaSO_4 + 2NH_3 + 2H_2O$

In his book "Manufacture of Soda," 2nd ed., American Society Monograph, S.N. 65, Reinhold Pub. Corp., Dr. Te-Pang Hou discusses scale formations in continuously operated towers of this industry. In Table 94, p. 234, he gives this approximate composition of distiller scale:

| | Percent |
|---|---|
| $CaSO_4$ | 62.41 |
| $CaO$ | 30.32 |
| $MgSO_4$ | 2.35 |
| $MgCO_3$ | 1.62 |
| $Na_2SO_4$ | 1.17 |
| $NaCl$ | 1.65 |
| $Fe_2O_3$ | 0.20 |
| $Al_2O_3$ | 0.08 |
| $SiO_2$ | 0.32 |
| Moisture | 0.60 |

He states:

"In the lime still or distiller proper, hard scale is likely to form and the distiller needs to be shut down and cleaned every so often. This happens once in 1 or 2 months, depending on the rate of operation and the quality of lime used. Frequent interruption in the distiller operation would cause solids to settle in the lime still necessitating more frequent cleaning. The scale formed in the upper portion of the lime still contains much calcium carbonate; while calcium sulfate predominates below, although lime is also present in considerable quantities."

Scaling, applicant has found, is due, to a large extent, to the $CaSO_4 \cdot 2H_2O \rightarrow CaSO_4 + 2H_2O$, gypsum→anhydrite reaction. During this reaction the crystals present in the reaction mixture increase in density—$CaSO_4 \cdot 2H_2O$ crystals with a density of about 2.31 changing to $CaSO_4$ crystals with a density of about 2.95. The higher density anhydrite nuclei and crystals obviously have a greater tendency to settle out of the mixture than do the lower density gypsum nuclei and crystals. Furthermore, applicant has discovered that in the particular environment, supersaturation is markedly increased by conversion of the gypsum to anhydrite crystals. By proper control of this reaction, as will hereinafter appear, scale formation can be inhibited in the ammonia distillation and its auxiliary equipment.

The invention will be better understood by reference to the drawings in which like parts are given like numbers throughout. Figure I is a diagrammatical side elevation, partly in cross-section of auxiliary apparatus for use in the ammonia-soda process and Figure II is a similar view of the distillation, limer and crystal control equipment for the ammonia-soda process.

Figure I illustrates a piece of equipment that can be employed as a limer or as a limer and precipitator-crystallizer. In either this or equivalent apparatus, the ammonia-soda process, when operated in accord with the invention, is effective in reducing scale. The principal operating zone 8 of the vessel is employed for the maintenance of a suspension of the precipitates of the reaction and crystals formed therefrom and from the distillation. The suspension may be effected by any suitable means such as that shown in the drawing, Figure I, in which pump 5 sucks the liquor from the zone 8 through line 6 and returns it to the zone through line 7. Line 7 is preferably extended to the base of the zone 8 to provide adequate and thorough stirring. Line 1 introduces liquor from the decarbonating section of a distillation tower, as hereinbefore described, line 2 milk of lime, line 3 anhydrite sludge from still effluent. Ordinarily the still effluent of a distillation tower goes to a settling tank in which anhydrite crystals settle out, which are returned, in my process, as relatively heavy slurry through line 3. Line 4 is a steam inlet to bring the reaction up to the desired metathetical reaction temperature. An overflow line 9 returns the treated liquor to the still described below. Line 10 is a vapor return to the still principally for the return of the ammonia evolved by the liming reaction, if that reaction is conducted in the zone 8.

When the invention is operated in apparatus such as shown in Figure I, liquor from the decarbonator section of a still is fed together with milk of lime and anhydrite sludge through circulating line 7 into the fluidized suspension maintained in chamber 8 of the precipitator-crystallizer. The ammonium sulfate lime Reaction A takes place in chamber 8, as well as the following reactions:

(B) $NaHCO_3 + NH_4Cl \rightarrow NaCl + NH_3 + CO_2 + H_2O$ (C) $2NH_4Cl + Ca(OH)_2 \rightarrow CaCl_2 + 2NH_3 + 2H_2O$ In this involved, at least, three reaction system, gypsum is present with a minimum of anhydrite from the still. The anhydrite content, however, in the fluidized suspension is increased until there is a sufficient amount of anhydrite crystal surfaces present on which the $CaSO_4$ can grow after it is thrown out of solution by the conversion of gypsum to anhydrite.

Figure II illustrates diagrammatically an alternate method of conducting the process of the invention. Instead of adding the anhydrite to the limer, as just described, a separate unit is provided for conjoint but separate use with a limer customarily used in the ammonia-soda process. The separate precipitator-crystallizer initiates the gypsum-anhydrite reaction which necessarily takes place in the ammonia-soda process, and heretofore took place under most unfavorable conditions for no scale deposition. More specifically the liquor to the precipitator-crystallizer of this alternate process consists of still liquor withdrawn from the still (after the limer), in accord with the invention and operation of the process as more fully illustrated by Figure II.

The apparatus of Figure II can be used with a vessel such as has been described in Figure I, the latter being used as the limer. Contrariwise, a conventional limer as illustrated in Figure II may be used. In the latter figure, the limer 20 removes and returns liquor to and from the decarbonating section of a still 21, while a precipitator-crystallizer conditions the liquor in the base of the still. The still 21 is heated by steam heating coils 22 or other suitable means. In the limer 20 line 23 carries the liquor from the still and line 26, the treated liquor back to the still 21. Milk of lime is introduced by line 25 and the ammonia driven off during the liming is returned to the still 21 by line 24.

The apparatus described in Figure I as a limer and precipitator-crystallizer is used with the apparatus of Figure II as a precipitator-crystallizer only. In this last-mentioned adaptation of its use, line 3 delivers anhydrite scale to the inverter.

Operation in accord with the apparatus of Figure II separates the liming operation from the crystal conditioning operation and scale eliminating steps of the process. Decarbonating liquor is withdrawn by line 23 from the tower, limed in vessel 20 and returned by line 26 to the tower; ammonia driven off in the limer likewise being returned by line 24. Scaling is most pronounced, in prior processes, in the upper part of the still section. It is inhibited by the process of the invention by withdrawing decarbonating liquors containing gypsum by line 1, mixing it with anhydrite in vessel X, wherein it is maintained in fluidized suspension at a temperature between 80° C. and 100° C., and preferably between 85° C.–90° C., until the conversion of gypsum to anhydrite has taken place, the converted liquor being returned to the still. Since its gypsum content has been reduced to substantially non-scaling concentrations, scaling in the still is reduced to a minimum.

The reaction, $CaSO_4 \cdot 2H_2O \rightarrow CaSO_4 + 2H_2O$, requires an appreciable amount of time. Gypsum slurry, as it is formed in the limer and returned via the normal liming operations of the industry, will flow some distance down the tower and when its temperature reaches 90–100° C., which is attained toward the base of the tower, and usually in the upper still section thereof, the reaction to anhydrite takes place rapidly. This reaction causes, applicant has discovered, a large increase in supersaturation due primarily to decreased solubility of the stable phase $CaSO_4$, and this sharp increase in supersaturation coupled with little available crystal surface for supersaturation release is the primary cause of scaling in the towers heretofore used in the industry.

By the invention and means described, applicant has found that scaling is inhibited by virtue of the stable, solid-phase anhydrite present in the solution before the reaction precipitates out that salt to cause the rapid increase in supersaturation. Consequently, the added anhydrite avoids undue supersaturation in the system when the anhydrite is being formed therein from gypsum and insures release of supersaturation without scale formation.

Whether the suspension crystallization vessel 8 is used as a limer per se or as a limer and crystallizer-precipitator, there should be a flow through the closed cycle in the order of 1000 gallons per minute or more per 100 g.p.m. of feed introduced from the still. Any suitable agitation can be employed to provide an equivalent amount of fluidized dispersion in that vessel. The amount of anhydrite sludge returned to the vessel through line 9 should be preferably twice the amount present in the feed entering through line 1 (with all $SO_4$ in the feed calculated as $CaSO_4$). In order to produce the desired amount of $CaSO_4$ to inhibit the formation of scale, the retention time of the still liquor in the reactor or vessel 8 should be at least 20 minutes. At relatively low temperatures (below 90° C.), considerably longer times are necessary.

While the manner and positioning of the equipment as described result in preferred embodiments of the invention, nevertheless the invention is not to be limited thereby, for other arrangements of the equipment will give reduced scaling providing the process is operated by inverting the crystal formation in a vessel removed from within the distillation zone.

I claim:

1. In the ammonia recovery phase of an ammonia-soda process containing a decarbonating zone and a still wherein scale formation on surfaces of the still is inhibited, the steps which comprise withdrawing liquor from the decarbonating zone of the ammonia-soda process, adding milk of lime thereto and returning the thus limed liquor to said process, and inhibiting scale formation, said scale containing anhydrite, on said surfaces by withdrawing limed liquor from the decarbonating zone, reducing the concentration of the anhydrite in the withdrawn liquor by crystallization and in a suspension of the limed liquor to which a slurry containing anhydrite crystals has been added returning the thus treated liquor to the still of the ammonia-soda process.

2. In the ammonia recovery phase of an ammonia-soda process wherein scale formation on heating surfaces is inhibited, the scale formation, resulting from decomposition of gypsum to anhydrite and deposition of anhydrite-containing scale, the steps which comprise withdrawing liquor, from the ammonia-soda still below that temperature at which the anhydrite reaction takes place rapidly, heating the withdrawn liquor to a temperature at which the anhydrite reaction takes place rapidly and the liquor becomes supersaturated with the anhydrite, crystallizing the anhydrite as a solid stable phase in the presence of added anhydrite crystals and returning the thus treated liquor reduced in dissolved anhydrite to the ammonia-soda still.

3. The process of claim 2 in which the withdrawn ammonia-soda reaction liquor is at a temperature below 90° C.

4. The process of claim 3 in which the withdrawn liquor is heated after withdrawal from the ammonia-soda reaction to a temperature above 90° C., and then returned to the reaction.

5. In the ammonia recovery phase of an ammonia-soda process wherein anhydrite ($CaSO_4$) containing scale, from decomposition of gypsum ($CaSO_4 2H_2O$), is inhibited, the steps which comprise withdrawing liquor from the ammonia-soda still at a temperature below 90° C., heating the withdrawn liquor to a temperature above 90° C. and in the presence of added anhydrite crystals, at which temperatures the withdrawn liquor becomes supersaturated in anhydrite which supersaturation is released on the added anhydrite crystals and returning the thus treated liquor reduced in dissolved anhydrite to the ammonia-soda still.

References Cited in the file of this patent

UNITED STATES PATENTS

| | | |
|---|---|---|
| 1,399,845 | Bull | Dec. 13, 1921 |
| 1,943,345 | Richardson | Jan. 16, 1934 |
| 1,962,150 | Mohler et al. | June 12, 1934 |
| 2,156,843 | Garrels et al. | May 2, 1939 |
| 2,182,078 | Fleming et al. | Dec. 5, 1939 |
| 2,437,182 | Barr et al. | Mar. 2, 1948 |
| 2,458,902 | Fitzhugh et al. | Jan. 11, 1949 |
| 2,594,723 | Berteaux | Apr. 29, 1952 |
| 2,698,225 | Svanoe | Dec. 28, 1954 |
| 2,737,440 | Roberts et al. | Mar. 6, 1956 |